July 9, 1940. W. C. ROE 2,207,161
VELOCIPEDE
Filed April 8, 1938 2 Sheets-Sheet 1

INVENTOR.
WILLIAM C. ROE
BY
ATTORNEY.

July 9, 1940. W. C. ROE 2,207,161
VELOCIPEDE
Filed April 8, 1938 2 Sheets-Sheet 2

INVENTOR.
WILLIAM C. ROE
BY
ATTORNEY.

Patented July 9, 1940

2,207,161

UNITED STATES PATENT OFFICE 2,207,161

VELOCIPEDE

William C. Roe, Elyria, Ohio, assignor to The Colson Corporation, Elyria, Ohio, a corporation of Ohio Application April 8, 1938, Serial No. 200,863

8 Claims. (Cl. 280—269)

This invention relates to velocipedes of the three wheel type, especially designed for children's use although not restricted thereto, and has for its primary object to provide an improved steering arrangement.

With the standard or common type of velocipede now in general use, the pedaling and steering are both effected through the medium of the front wheel, the rear wheels being rotatably mounted in rigid parallel relation at all times. This arrangement has several disadvantages, each of which is of substantially equal importance. In the first place, the pivotal mounting of the front wheel materially interferes with the pedaling of the velocipede, particularly when making a turn, by reason of the fact that the front wheel must be turned at a sharp angle thus bringing one of the pedals close to the rider causing a cramped position of one leg, while the other pedal is moved away from the rider necessitating a stretch and likewise causing an unnatural and cramped position of the other leg. Another disadvantage resulting from the turning of the front wheel of the velocipede is that the handle bars, being secured to the front wheel, likewise turn to an objectionable position where, in extreme cases, one of the handle bar grips engages the body of the rider with an uncomfortable result. A still further disadvantage in front wheel steering is the fact that the rear wheels never follow the front wheel on turns, with the result that frequently the inside rear wheel will run off a curb or other edge of the ground over which the velocipede is traveling often throwing the rider and in some instances causing injury.

In view of the foregoing disadvantages, it is a further object of the present invention to provide a three wheeled velocipede wherein the front wheel is used for pedaling only and the steering is effected by a turning of the rear wheels thereby eliminating all of the objectionable disadvantages inherent in the standard or common type of velocipede as pointed out.

It is a further object of the present invention to provide a velocipede of the type referred to which is speedier, has better control, is strong, light, compact, simple in construction and more easily assembled.

Another object of the invention is to provide a steering arrangement which is simple in operation, embodies a minimum number of parts, and is of rugged construction.

With the objects above indicated, and other objects hereinafter explained in view, my invention consists in the construction and combination of elements hereinafter described and claimed.

Referring to the drawings.

Figure 2:
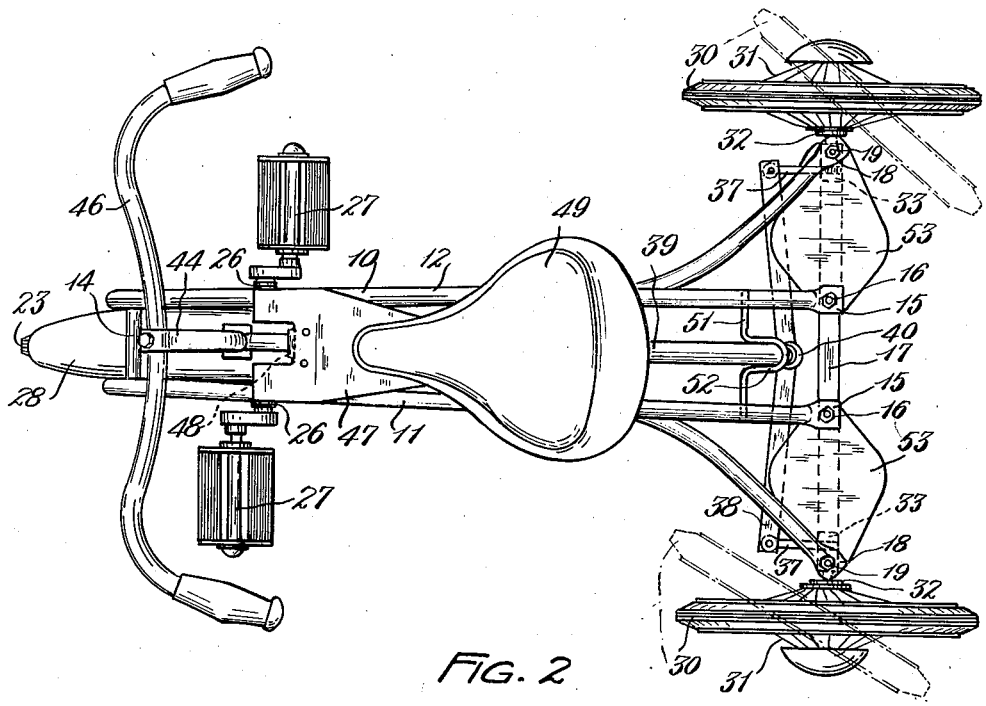
Figure 2 is a top plan view of the velocipede shown in Figure 1 but on a slightly larger scale.

In the drawings I have illustrated the invention embodied in a child's velocipede of special design but it should be understood that it may be readily adapted for other types and is not therefore, so limited.

The velocipede comprises a frame 10 of tear drop simulation in side elevation to give a stream line appearance which will be particularly appealing to children. The frame 10 is formed of steel tubing and consists of side members 11 and 12 arranged in parallel spaced relation and having a large looped portion 13 at their forward end. A tubular spacer member 14 is disposed between the side members 11 and 12 at the forward end thereof and welded or otherwise secured so as to reinforce the structure and maintain the side members in spaced relation. The free ends of the upper portion of the side members 11 and 12 extend downwardly on an arc diverging slightly relatively and have lateral extensions 15 which are bolted at 16 or otherwise secured to a transversely extending wheel connecting member 17, the construction of which will be later more fully described. The free ends of the lower portion of the side members 11 and 12 extend outwardly on an arc and downwardly and have lateral extensions 18 which are likewise bolted at 19 or otherwise secured to the wheel connecting member 17 outwardly of the extensions 15. A tubular spacer member 20 is disposed between the side members 11 and 12 at the lower portion thereof and toward the rear and is welded or otherwise secured so as to reinforce the structure and maintain the side members in spaced relation.

This results in a very rigid frame construction which is light in weight and the lines of which are particularly pleasing in appearance.

The side members 11 and 12 may be formed of single lengths of steel tubing if desired, but in the present instance and for simplicity in assembly each side member is formed in two sections and the adjacent ends are connected to bearing clips 21 by bolts 22. A rubber tired wheel 23 is disposed between the side members 11 and 12 and has wire spokes 24 extending between the rim and a central hub 25, the latter being rotatably mounted in the bearing clips 21 by means of axial extensions 26 which project beyond the clips and to which pedals 27 are connected in the usual manner. It will be noted that this wheel 23 is free to rotate under the influence of the feet and legs so that the velocipede may be propelled in either direction but that no angular turning movement is provided, this turning or steering being accomplished by means which will be later described. A mud guard 28 extends around the upper portion of the wheel 23 being disposed between the side members 11 and 12 and has its opposite ends connected by bolts 29 to the spacer members 14 and 20 respectively.

Rear rubber tired wheels 30 have wire spokes 31 extending between the rims and central hubs 32 the latter being rotatably mounted on stub axles provided with inwardly extending co-axial proections 33 which are pivotally connected to the outer ends of the wheel connecting member 17. This member 17 preferably consists of a pair of flat steel bars 34 arranged one above the other in spaced parallel relation with spacer members 35 adjacent the bolts 16 and the projections 33 function as spacer members for the outer ends of the bars, the pivotal connection being provided by means of bolts 19 which project through aligned openings provided in the ends of the bars 34 and the projections 33. In this manner each rear wheel 30 is provided with an independent pivot, the axis of which is transverse to the axis of rotation of the wheel 30.

Each of the projections 33 has a lateral extension 37 extending forwardly and a transversely extending bar 38 has its opposite ends pivotally connected to the free ends of the extensions 37. This bar 38 is bent rearwardly at its central portion so that its arms diverge slightly toward their pivotal connection. This arrangement also permits pivotal movement of the wheels 30 to different angular positions so that the rear wheels 30 will always track properly with the front pedaling wheel 23. In the present instance the inside rear wheel, on a turn, is capable of angular movement of approximately 45 degrees while the outside rear wheel assumes an angular position of approximately 30 degrees. It will be noted that a much more natural and unresistable turn is permitted with rear wheel steering of this character than in the instance of front wheel steering wherein the rear wheels tend to drag or slide around but never track.

Different ways of steering the rear wheels may be employed but a very simple and efficient construction is illustrated in the drawings. It consists of a tubular member 39 disposed between the upper rear portion of the side members 11 and 12 and bent approximately to a corresponding shape. The rear end has a socket member 40 secured thereto and is adapted for swivel connection with a ball headed lug 41 connected to the central portion of the bar 38 by a nut 42, as more clearly shown in Figure 3. The forward end of the tubular member 39 is provided with an enlargement 43 having a vertically disposed opening therein adapted to slidably receive the lower end of a stem 44 which is secured in the desired adjusted position by means of a set screw 45. The stem 44 is of the usual form and on its outer end a handle bar 46 is securely mounted. The forward end of the tubular member 39 may be movably supported in any desirable manner but preferably a resilient flat plate 47 has its forward end welded or otherwise secured to the side members 11 and 12 at the upper central portion thereof as more clearly shown in Figures 1 and 2. This plate 47 is provided with a depending tongue 48 at its front end and has an opening extending therethrough through which the forward end of the tubular member freely projects. This arrangement secures the forward end of the tubular member 39 in proper position for gripping the handle bars but permits sufficient movement so as not to interfere with the easy steering of the rear wheels.

The plate 47 has a tapering free end which projects rearwardly and on which a saddle 49 of well known construction is mounted. A slotted opening may be provided in the free end of the plate 47 to permit longitudinal adjustment of the saddle to accommodate riders of different sizes and may be secured in adjusted position by means of a nut 50.

To provide a guide for the lower end of the tubular member 39, a rod 51 has its opposite ends welded or otherwise secured to the adjacent side members 11 and 12 and is provided with a loop 52 through which the adjacent portion of the tubular member 39 extends.

Figure 1:
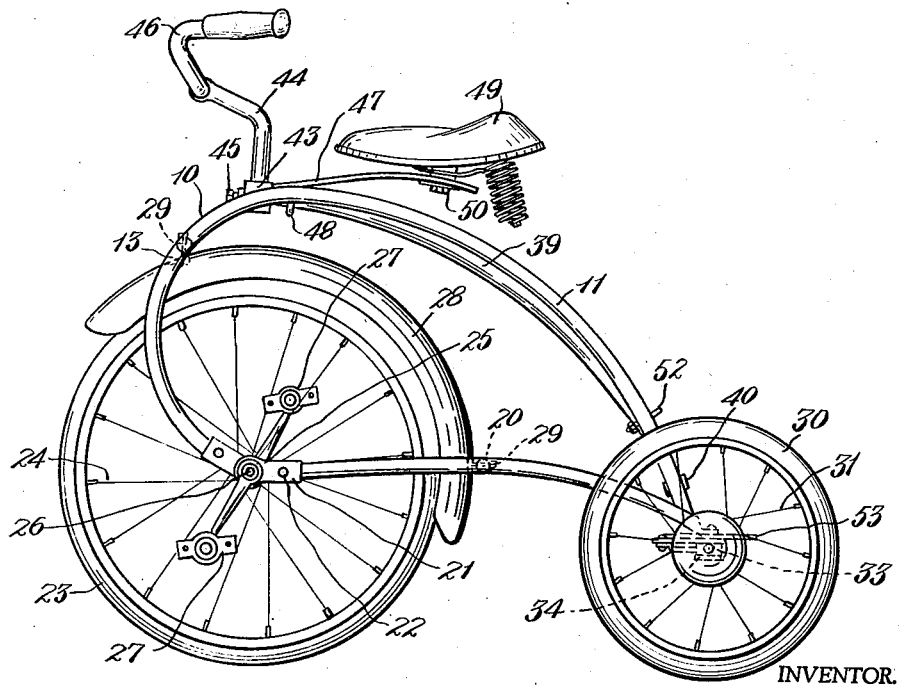
Figure 1 is a side elevational view of a velocipede embodying the present invention.
Figure 3:
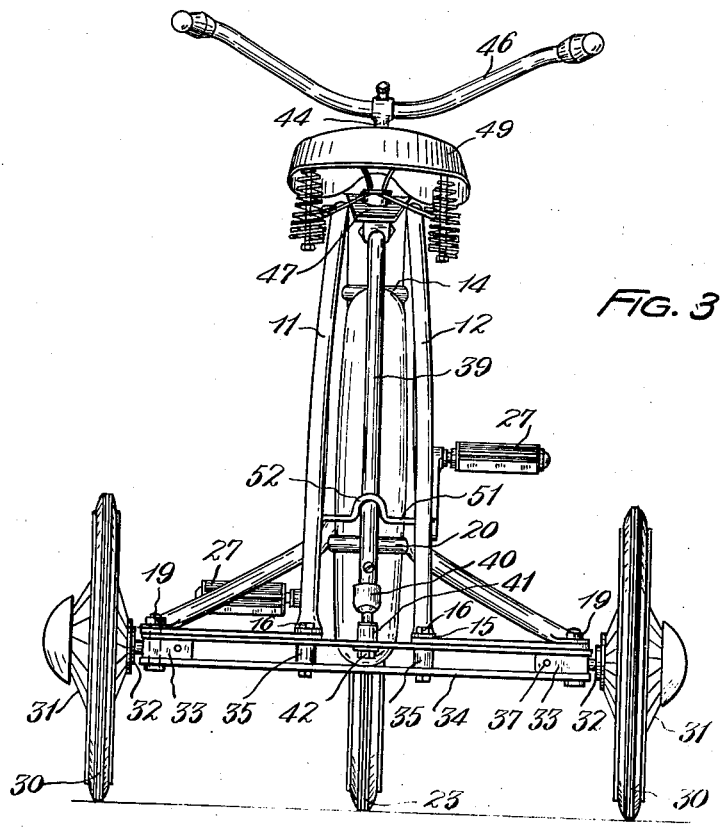
Figure 3 is a rear elevational view of the velocipede.
Figure 4:
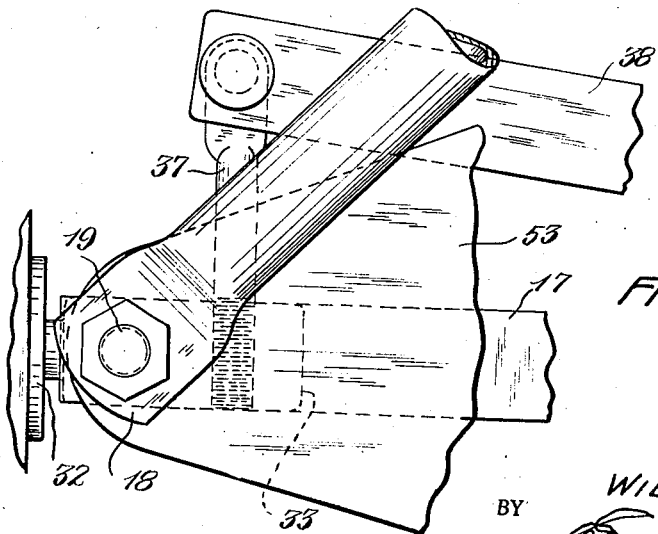
Figure 4 is a fragmentary top plan view of the rear wheel steering arrangement shown on an enlarged scale.

Step plates 53 may be mounted on the upper side of the connecting member 17 as shown in Figures 1 and 3.

In the operation of the velocipede the front wheel may be rotated by means of the pedals and thus propelled along the ground. Inasmuch as the front wheel does not turn in steering, the pressure exerted by the rider on the pedals will be equalized at all times thus increasing the efficiency of the velocipede. By pressing downwardly on one handle bar grip or the other the rear wheels are caused to turn about their pivots in one direction or the other in an arc which always follows the front wheel. This eliminates frictional resistance and consequently accounts for increased speed.

The movement of the handle bars is the same as the natural motion of the body when turning. Maximum power can be applied to the pedals for propulsion of the velocipede at all times by reason of the fact that there is no turning movement of the front pedaling wheels during the steering operation. The old style of steering is direct while the new arrangement embodying the present invention allows a wider range in the leverage and movement ratio. Rear wheel steering of the type described permits a shorter turn radius than is possible with front wheel steering.

While I have described the preferred embodiment of the invention it is to be understood that I am not to be limited thereto inasmuch as changes and modifications may be resorted to without departing from the spirit of the invention as defined in the appended claims.

What is claimed is:

1. In a velocipede, a frame comprising metal side members arranged in spaced relation, a pedaling wheel disposed between said side members and rotatably mounted at one end of the latter, a pair of steering wheels rotatably mounted at the opposite ends of said side members, each of said steering wheels having a pivotal connection with said side members for movement about an axis transversely of the axis of rotation of said wheels, and a manually operable member having one end operatively connected to said steering wheels and its other end disposed adjacent said pedaling wheel and adapted to move said steering wheels about their pivotal axes.

2. In a velocipede, a frame comprising tubular metal side members arranged in spaced relation, said side members being looped at their forward ends and having free ends projecting rearwardly, a pedaling wheel rotatably disposed between said side members at the forward ends of the latter, a cross member at the rear portion of the side members and to which the free ends of the latter are connected, a pair of steering wheels, stub axles on which said steering wheels are rotatably mounted, each of said stub axles having a pivotal connection with the adjacent end of said cross member for movement about an axis transversely of the axis of rotation of said steering wheels, a member pivotally connected at its opposite ends to the respective stub axles for unitary pivotal movement, and a manually operable member having one end operatively connected to said last mentioned member and its opposite end disposed adjacent said pedaling wheel and adapted to move said last mentioned member for turning said steering wheels about their pivotal axes.

3. In a velocipede, a frame, a pedaling wheel rotatably mounted at one end of said frame, and a pair of steering wheels rotatably mounted at the opposite end of said frame, each of said steering wheels having a pivotal connection with said frame for movement about an axis transversely of the axis of rotation of said wheels, a resilient plate having one end connected to said frame above said pedaling wheel and its other end free and projecting rearwardly, a saddle mounted on the free end of said plate, and a manually operable steering member having one end operatively connected to said steering wheels and its other end freely supported adjacent said plate and adapted to move said steering wheels about their pivotal axes.

4. In a velocipede, a frame, a pedaling wheel rotatably mounted at one end of said frame, and a pair of steering wheels rotatably mounted at the opposite end of said frame, each of said steering wheels having a pivotal connection with said frame for movement about an axis transversely of the axis of rotation of said wheels, a resilient plate having one end connected to said frame above said pedaling wheel and its other end free and projecting rearwardly, a saddle mounted on the free end of said plate, a manually operable steering member having one end operatively connected to said steering wheels and its other end freely supported adjacent said plate and adapted to move said steering wheels about their pivotal axes, and handle bars connected to the free end of said steering member by which the latter may be moved.

5. In a velocipede, a frame, a pedaling wheel rotatably mounted at one end of said frame, a pair of steering wheels rotatably mounted at the opposite end of said frame, each of said steering wheels having a pivotal connection with said frame for movement about an axis transversely of the axis of rotation of said wheels, a resilient plate having one end connected to said frame above said pedaling wheel and its other end free and projecting rearwardly, a saddle mounted on the free end of said plate, and a manually operable steering member having one end operatively connected to said steering wheels and its other end freely supported by a tongue formed on said plate and adapted to move said steering wheels about their pivotal axes.

6. In a velocipede, a frame comprising metal side members arranged in spaced relation, a pedaling wheel disposed between said side members and rotatably mounted at one end of the latter, a cross member comprising bars arranged one above the other and in spaced relation and to which the opposite ends of the side member are connected, a pair of steering wheels, stub axles on which said steering wheels are rotatably mounted, each of said stub axles having a pivotal connection with the adjacent ends of said bars for movement about an axis transversely of the axis of rotation of said steering wheels, a member pivotally connected at its opposite ends to the respective stub axles for unitary pivotal movement, and a manually operable member having one end operatively connected to said last mentioned member and its opposite end disposed adjacent said pedaling wheel and adapted to move said last mentioned member for turning said steering wheels about their pivotal axes.

7. In a velocipede, a frame comprising tubular metal side members arranged in spaced relation, said side members each being looped at its forward end portion and having rearwardly projecting free ends arranged in spaced relation transversely, a pedaling wheel disposed between the forward looped portions of said side members and rotatably mounted at the lower portion thereof, a cross member at the rear portion of said side members and to which the free ends of the latter are secured in their spaced relation, a pair of steering wheels, stub axles on which said steering wheels are rotatably mounted, each of said stub axles having a pivotal connection with the adjacent end of said cross member for movement about an axis transversely of the axis of rotation of said steering wheels, a member pivotally connected at its opposite ends to the adjacent stub axle for effecting simultaneous pivotal movement of said steering wheels, and a manually operable member having one end operatively connected to said last mentioned member and its opposite end disposed adjacent said pedaling wheel whereby said steering wheels may be turned about their pivotal axes.

8. In a velocipede, a frame comprising tubular metal side members arranged in spaced relation, said side members each being looped at its forward end portion and having rearwardly projecting free ends arranged in spaced relation transversely, members extending between said side members and connected to the latter for securely maintaining said side members in spaced relation, a pedaling wheel disposed between the forward looped portions of said side members and rotatably mounted at the lower portion thereof, a cross member at the rear portion of said side members and to which the free ends of the latter are secured in their spaced relation, a pair of steering wheels, stub axles on which said steering wheels are rotatably mounted, each of said stub axles having a pivotal connection with the adjacent end of said cross member for movement about an axis transversely of the axis of rotation of said steering wheels, a member pivotally connected at its opposite ends to the adjacent stub axle for effecting simultaneous pivotal movement of said steering wheels, and a manually operable member having one end operatively connected to said last mentioned member and its opposite end disposed adjacent said pedaling wheel whereby said steering wheels may be turned about their pivotal axes.

WILLIAM C. ROE.